United States Patent [19]

Moss

[11] 4,072,428
[45] Feb. 7, 1978

[54] INSPECTING AND MEASURING OF SOFT CONTACT LENSES

[76] Inventor: Herbert L. Moss, 845 Field Ave., Plainfield, N.J. 07060

[21] Appl. No.: 691,349

[22] Filed: June 1, 1976

[51] Int. Cl.² .................. G01N 21/16; G02B 7/02; G01B 9/00
[52] U.S. Cl. .................................. 356/244; 350/245; 350/257; 356/125
[58] Field of Search ............. 356/244, 239, 124, 125; 350/245, 247, 252, 257

[56] References Cited

U.S. PATENT DOCUMENTS

| | | | |
|---|---|---|---|
| 3,455,169 | 5/1969 | Lueck | 356/124 |
| 3,804,523 | 4/1974 | McCormack | 356/124 |
| 3,820,899 | 6/1974 | McCormack | 356/124 |
| 3,861,808 | 1/1975 | Halsey | 356/124 |
| 3,917,391 | 11/1975 | Padula | 356/244 |
| 3,985,445 | 10/1976 | Tagnon | 356/125 |

*Primary Examiner*—Verlin R. Pendegrass
*Assistant Examiner*—Donald P. Walsh
*Attorney, Agent, or Firm*—Martha G. Pugh

[57] ABSTRACT

A series of units for manual use or for use in combination with a standard lensometer for evaluating the parameters of soft or flexible contact lenses. The units comprise convexly disposed hemispheres of graduated diameters comprising rigid or semi-rigid material, each of which has a round central aperture and is marked on its convex surface with a series of concentric calibration circles. In preferred form, each of the convex hemispheres is integrally formed with a flat supporting plate, with the convex side protruding and the concave interior having an internal dimension which accommodates any conventional lensometer or similar lens testing instrument. The soft lens whose curvature is to be measured is placed by trial and error on successive inspection and measuring units until the curvature matches or falls between two units of known radii. The unit including the lens is then attached to a stop of the vertometer or other optical instrument for reading the refractive power, or can be held in conjunction with a hand magnifier or biomicroscope to determine other lens parameters, and for inspecting the surfaces and edges of the lens.

6 Claims, 12 Drawing Figures

INSPECTING AND MEASURING OF SOFT CONTACT LENSES

BACKGROUND OF THE INVENTION

Soft or flexible contact lenses, known as hydrophilic lenses, of the general type of those marketed by Bausch & Lomb, Inc. under the trademark "SOFLENS", are in wide use today. Because of the small size and slippery condition of these lenses, especially when in a hydrophilic (wetted) state, they are cumbersome to manipulate for measurement of their optical parameters and for inspection of their edges and surfaces for flaws or deposits. To date, no prior art instruments or techniques have been developed which satisfactorily solve these problems.

SUMMARY OF THE INVENTION

It is, therefore, a principal object of this invention to provide simple techniques and apparatus to facilitate the measurement of soft contact lens parameters and the inspection of the characteristics and condition of such lenses.

These and other objects are realized in the technique and apparatus of the present invention which includes a series of hemispheres ranging from, say, fifteen to nineteen millimeters in diameter in intervals of, say, 0.50 millimeters, each formed of rigid material such as plastic, metal, hard rubber or rubber substitutes, and including a central round aperture of, say, between 3.50 to 4.50 millimeters surrounded by a series of calibration circles ranging from, say, 12.00 to 17.00 millimeters in diameter, in 1 millimeter divisions. A translucent white plastic, etched with concentric circles of a contrasting color, permits the best visibility of the lens. Each hemisphere is preferably mounted on a flat plate with the convex side out and the concave side having its peripheral edges fixed to the plate and dimensioned internally to fit onto any conventional vertometer, lensometer or similar conventional lens testing device. Alternatively, the units can be used to mount soft contact lenses, either for inspection by a hand microscope or biomicroscope.

It is contemplated that the following evaluations can be made with great facility, using the devices and techniques of the present invention:
1. prescription of the lens;
2. posterior radius of curvature of the lens;
3. overall diameter of the lens; and
4. inspection of the lens surfaces and edges.

These and other objects and advantages of the invention can be better appreciated by studying the detailed specification of the invention with reference to the attached drawings.

DETAILED DESCRIPTION

As pointed out in the introduction, the purpose of this invention is to provide the contact lens practitioner with a quick, simple and reasonably accurate office procedure to evaluate the parameters of a soft or flexible contact lens. As used in this application, the term "soft lens" refers to contact lenses comprising well-known types of transparent hydrophilic plastic materials, such as silicone or other flexible materials. It is often desirable to measure the parameters of these lenses in the hydrated state in which they are very slippery and lacking in rigidity.

Figure 1:
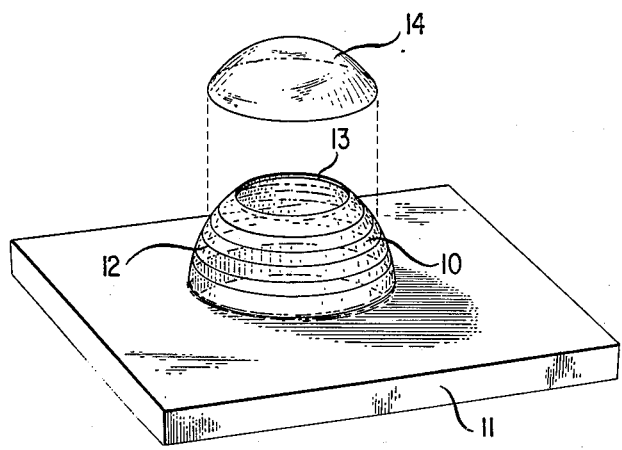
FIG. 1 is an enlarged showing of a typical hemispheric unit of the present invention mounted on a base plate, with a soft contact lens posed in adjacent position to the unit.

Referring to FIG. 1 of the drawings, there is shown in perspective one of a graduated set or series of inspection and measuring units in accordance with the present invention which are especially designed and adapted for the measurement of the parameters of soft contact lenses.

The unit comprises a hemisphere 10 formed of any suitable rigid material which can be precision molded or cast in the desired form. These may comprise plastics such as, for example, polymethylmethacrylate or acrylic polymer, or metals such as aluminum or stainless steel. The principal criterion is that the dimensions of the material selected do not change appreciably with changes in temperature and/or pressure within the ambient range. The surface should be highly polished and is preferably white, translucent in appearance and should be etched, engraved or imprinted with calibration circles 12 in a highly visible contrasting color, such as black or red.

In preferred arrangement, each of the hemispheres is mounted on a rectangular base plate 11 which for convenience may be, say, 21 millimeters long, twelve millimeters wide and 5 millimeters thick, and preferably molded integrally with the hemisphere 10 being of the same material. Alternatively, the base plate 11 may be of a different material than the hemisphere 10, being any metal or plastic which is rigid and not readily deformable and has substantially the same temperature coefficient of expansion as the hemisphere 10.

It is contemplated that a set of tools in accordance with the present invention may comprise, say, six hemispheres ranging in radius from 7.50 to 9.50 or 10 millimeters, in graduated steps of 0.50 millimeters, having central circular apertures ranging from 3.50 to 4.50 millimeters.

Figure 2:
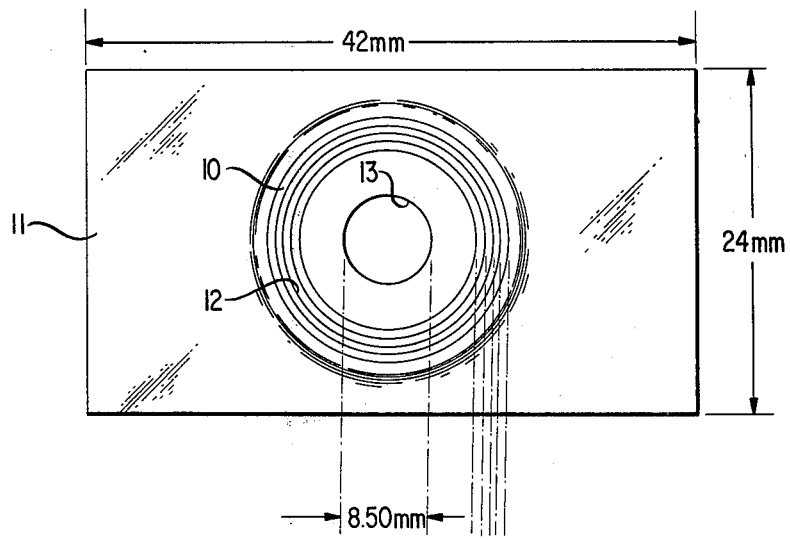
FIG. 2 is a schematic showing in plan view of a typical hemispheric unit of the present invention, indicating the positions of typical calibration circles.
Figure 3:
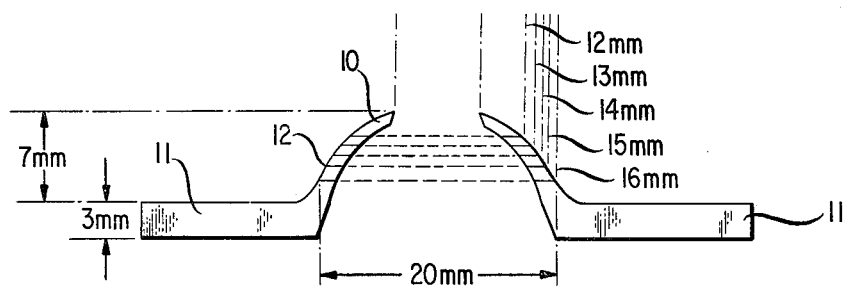
FIG. 3 is a schematic section along the diameter of the typical hemispheric unit of FIG. 2, indicating typical dimensions.

Referring to FIGS. 2 and 3, there is shown schematically (to scale), the dimensions of a typical one of the series of hemispheres of the present invention having an actual radius of ten millimeters, and a central aperture 13 which is 4.25 millimeters in diameter. This unit is etched, engraved or otherwise marked with a series of calibration circles 12 concentric with aperture 13 at divisions of 1.00 millimeter, ranging from a circle of 12 millimeters diameter nearest the aperture to a circle of 16 millimeters diameter near the base. Although the units have been called "hemispheres" for convenience of description, it will be understood that they may actually be semispheroidal, since the arc comprising the convex outer shell may be less than 180°, having been cut off at the base by a cord shorter than the diameter.

As shown in section in FIG. 3, the maximum internal diameter of the typical unit under description, as measured at the base, is 20 millimeters, declining to 18 millimeters measured along a plane parallel to the top of the 3 millimeters thick supporting base. The outer diameter, measured along this plane, is 22½ millimeters. Thus, the wall thickness of the unit under description is about 2 millimeters at the base, tapering to a wall thickness of about 1 millimeter near the aperture (as measured in a vertical plane). It will be apparent that the internal dimension of the unit can be varied in design by varying the wall thickness to form snap-on fittings with each of the standard vertometers or lensometers.

METHOD OF USE

1. Measuring Prescription of the Lens

Figure 4:
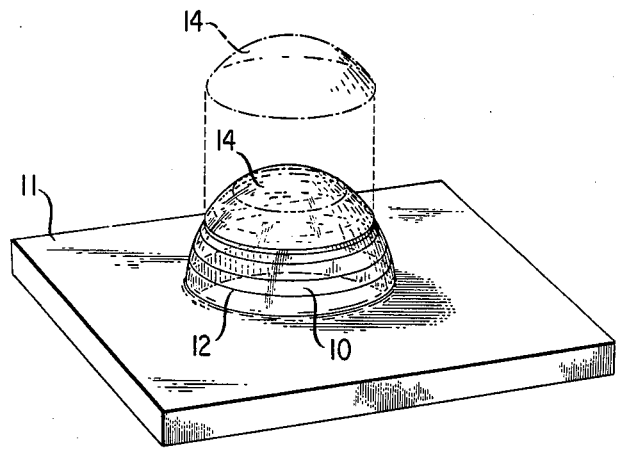
FIG. 4 shows a soft contact lens mounted for measurement on the unit shown in FIG. 1.
Figure 5:
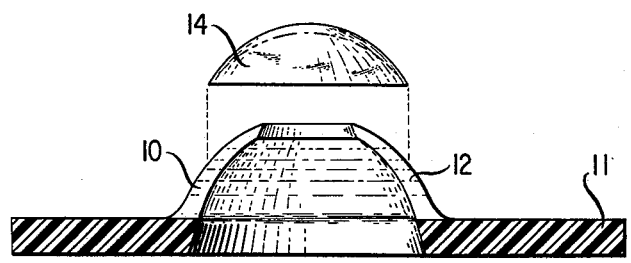
FIG. 5 is an enlarged schematic sectional showing of FIG. 4, indicating a soft contact lens posed for application to the unit.
Figure 6:
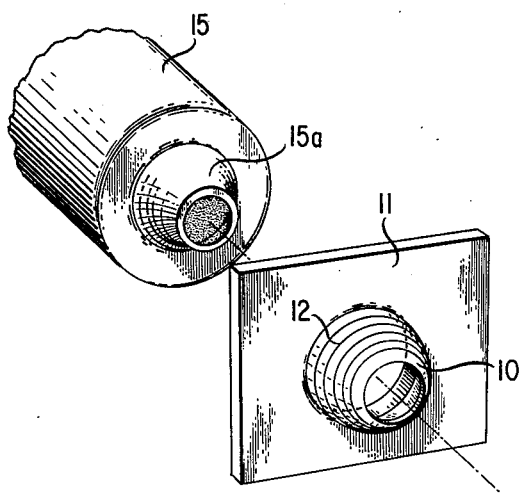
FIG. 6 shows the unit of FIG. 1 posed adjacent the end of a lensometer or vertometer stop.
Figure 7:
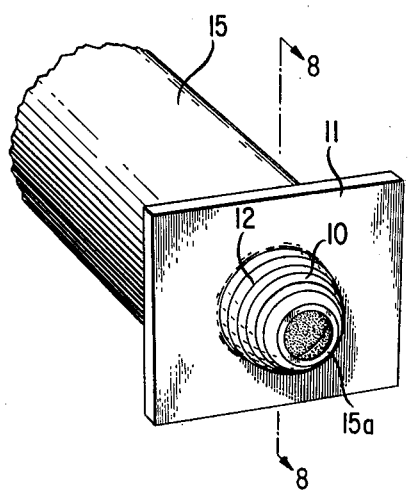
FIG. 7 shows the unit of FIG. 1 mounted on the stop of a lensometer or vertometer.
Figure 9:
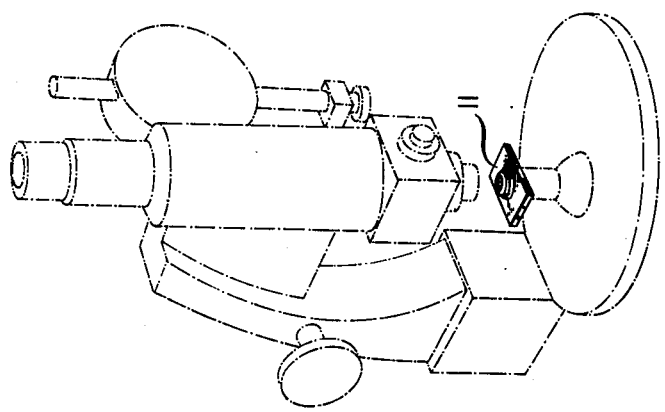
FIG. 9 shows in phantom an instrument, of a type manufactured by the American Optical Company under the name "AO Radiuscope", with a typical unit of the present invention mounted on its stop, in the manner of FIGS. 7 and 8.
Figure 8:
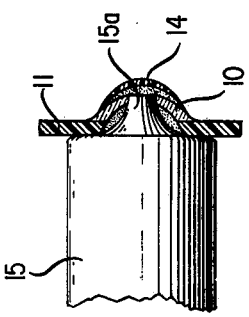
FIG. 8 is a longitudinal section taken along the plane indicated by the arrows 8-8 of FIG. 7.

For this purpose, a soft lens 14 is placed in the palm of the operator's hand and dried off by rubbing a finger across it in a squeegie manner or blotted with lint free paper until the surface is substantially dry. As shown in perspective in FIG. 4 and in section in FIG. 5, the lens 14 is placed by trial and error on successive units of the series until one is found whose posterior radius is as close as possible to that of the lens. The composite of the lens and unit is then attached to the protruding upper end of the stop of a vertometer, as shown in FIGS. 6 and 7. The relationship of the vertometer stop to the measuring unit on which the lens has been mounted is shown more clearly in the sectional showing of FIG. 8, which shows the reduced diameter tip 15a of the vertometer 15 interposed into the hollow interior of the hemisphere unit 10. The stop 15, with the attached lens, is mounted on the work surface of a standard vertometer, as shown in FIG. 9. The mires (images as seen through the vertometer) will appear clear, enabling the operator to read the soft lens prescription as one would read that of a spectacle lens.

2. Posterior Radius of Curvature of the Lens

The soft contact lens 14 in its normal hydrophilic condition (e.g., about 35 to 85 percent hydrated) is placed lightly on the measuring and inspection unit 10 and is viewed laterally through a 10-power magnifier. As previously described with reference to the prescription measurement, units of the series are selected by trial and error until the correct one is found. If the edges of the lens stand off of the convex fact of the unit, a flatter unit of the series is selected until the curvatures of the lens and the measuring unit appear to approximately match, or the curvature of the lens falls between two units of known radii. If, on the other hand, the curvature of the lens appears too steep and a space is visible near the zenith of the hemispheric measuring unit, a member of the series having steeper curvature is selected. This process is repeated until the correct match is found. An approximate match of within two-tenths of a millimeter should easily be obtainable by this method.

Figure 11:
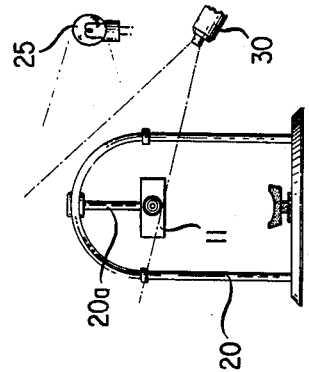
FIG. 11 is an enlarged fragment of FIG. 10 showing the headrest attachment for holding the soft contact lens inspection and measuring unit of the present invention together with schematic indications of a light source and microscope.
Figure 10:
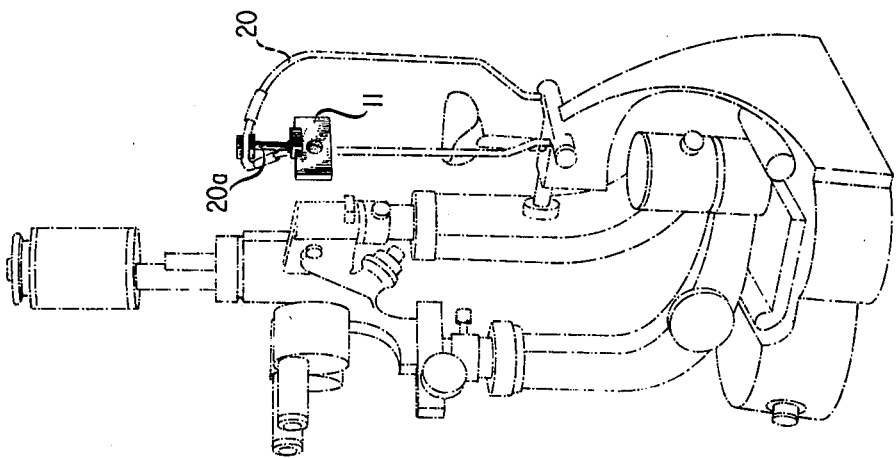
FIG. 10 shows in phantom a Poser Slit Lamp, of a type manufactured by Bausch & Lomb, Inc., on which is mounted a unit of the present invention for microscopic examination.

To facilitate determination of the alignment between the hemispheric measuring unit and the soft lens under test, a biomicroscope may be used. This is best achieved by mounting the hemispheric unit 10, together with the soft lens 14 under test, on an attachment 20a suspended from the arch-shaped bracket 20 of a Poser Slit Lamp assembly of the type manufactured, for example, by Bausch & Lomb, Inc., as shown in FIGS. 10 and 11. The attachment 20a comprises a standard metal clamp fastened at its upper end to the zenith of the bracket 20 and fastened at its lower end to a central position along one edge of the plate 11, so that the hemisphere 11 with the superposed test lens 14, is directed with its concave side out and the convex side toward the microscope. A beam from the slit lamp light source 25 is directed toward the test lens mounted on the hemisphere 10 and a biomicroscope 30, in the hands of the operator, is directed transversely towards hemisphere 10.

3. Overall Diameter of the Lens

The lens in its hydrophilic condition is placed on the matching measuring and inspection unit 10, as previously described. Under observation by the operator using a ten power hand magnifier, it is centered on the matching unit so that the posterior edge falls on or adjacent one of the calibration circles 13. Since the circles are of known diameter, the lens diameter can be determined exactly, or certainly within 0.25 millimeters.

4. Inspection of the Lens Surfaces and Edges

Lens 14 is placed on the appropriate inspection and measuring unit 10 in either hydrophilic or dry condition, depending on which observation the examiner wishes to make. The surface is inspected with a ten power hand magnifier for the amount and nature of deposits or any damage to the surface including defects or fractures. In a similar manner the edges are viewed for breaks or for turned or rough edges. If inspection in greater detail is desired, the lens can be placed on the biomicroscope attachment 30 as shown in FIGS. 10 and 11, whereon it is illuminated with a beam from a slit lamp and viewed by means of a microscope 40, using the types of illumination and magnification conventionally used to inspect the human eye.

In order to more clearly view the alignment of the posterior surface of the lens, a beam from the thin slit of the lamp is directed onto the lens and the separation noted between the reflections from the anterior and posterior lens surfaces. As indicated previously, a unit of greater or lesser curvature is selected to achieve the best possible alignment between the lens and the measuring unit.

Figure 12:
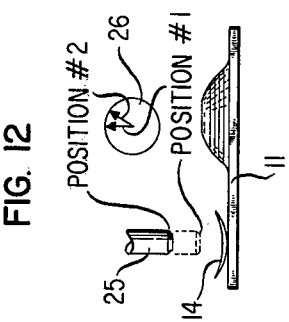
FIG. 12 indicates schematically the method of measuring the thickness of a contact lens using a radiuscope.

The thickness of the contact lens 14 may be measured, using a radiuscope of the type shown, for example, in FIG. 10, in the manner indicated schematically in FIG. 12 of the drawings.

The cross-line images (or mires) of the radiuscope are first focussed on the upper surface of the flat plate 11, placed on the work surface of the instrument, without the soft lens being present; and the focussing knob 26 is then set in the first or zero position. The soft lens 14 is then placed concave side up on the flat surface of plate 11 after the water has been squeezed off of the lens, and the mires or cross-line images are refocussed. The difference in the setting, as indicated on focussing knob 26, is noted, as the barrel is moved to the refocussing position. This procedure enables the thickness of soft lens 14 to be measured to hundredths of a millimeter.

It will be understood that the present invention is not limited to the specific forms or dimensions disclosed herein by way of illustration, but only by the scope of the appended claims.

What is claimed is:

1. A series of tools for inspecting and measuring soft contact lenses, each said tool comprising a substantially flat plate formed integrally with a convex semispheroidal protrusion having a round central opening, the inverse concave interior of each said protrusion being dimensioned to form a snap-on fitting for the stop of a standard measuring instrument, the protrusions of the tools of said series having graduated external radii of curvature.

2. The combination in accordance with claim 1 wherein the convex surface of each of said semispheroidal parts contains a plurality of concentric calibration circles at graduated intervals surrounding said central opening.

3. The combination in accordance with claim 1 wherein the radii of the semispheroidal parts of said series varies from 7.50 to 9.50 millimeters in 0.50 millimeter intervals.

4. The combination in accordance with claim 2 wherein said concentric circles vary in diameter from 12.00 to 17.00 millimeters in 1.00 millimeter divisions.

5. The combination in accordance with claim 1 wherein said central opening ranges in size from 3.5 to 4.5 millimeters in diameter.

6. The method of inspecting and measuring the parameters of a soft contact lens which comprises imposing said lens on the convex side of a semispheroidal part of approximately matching radius whose inverse interior concavity is accomodated in snap-on relation on the stop of a standard lens measuring instrument.

* * * * *

UNITED STATES PATENT AND TRADEMARK OFFICE
CERTIFICATE OF CORRECTION

PATENT NO. : 4,072,428
DATED : February 7, 1978
INVENTOR(S) : Herbert L. Moss

It is certified that error appears in the above-identified patent and that said Letters Patent are hereby corrected as shown below:

Column 3, line 31, change "dimension" to --dimensions--; line 68, change "fact" to --face--. Column 4, line 37, change "13" to --12--; line 52, change "30" to --20--; line 54, change "40" to --30--. Column 6, line 10, change "varies" to --vary--.

Signed and Sealed this

Twenty-second Day of August 1978

[SEAL]

Attest:

RUTH C. MASON
Attesting Officer

DONALD W. BANNER
Commissioner of Patents and Trademarks